(12) United States Patent
Ren

(10) Patent No.: US 10,462,257 B2
(45) Date of Patent: Oct. 29, 2019

(54) METHOD AND APPARATUS FOR OBTAINING USER ACCOUNT

(71) Applicant: TENCENT TECHNOLOGY (SHENZHEN) COMPANY LIMITED, Shenzhen (CN)

(72) Inventor: Jie Ren, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 164 days.

(21) Appl. No.: 15/447,201

(22) Filed: Mar. 2, 2017

(65) Prior Publication Data
US 2017/0180506 A1 Jun. 22, 2017

Related U.S. Application Data

(63) Continuation of application No. PCT/CN2016/079419, filed on Apr. 15, 2016.

(30) Foreign Application Priority Data

Apr. 22, 2015 (CN) .......................... 2015 1 0196582

(51) Int. Cl.
*H04L 29/06* (2006.01)
*H04L 29/12* (2006.01)
(Continued)

(52) U.S. Cl.
CPC ............ *H04L 67/306* (2013.01); *G06F 21/31* (2013.01); *G06F 21/6254* (2013.01);
(Continued)

(58) Field of Classification Search
None
See application file for complete search history.

(56) References Cited

U.S. PATENT DOCUMENTS

2008/0188308 A1* 8/2008 Shepherd ................ G07F 17/32
463/39
2009/0276377 A1* 11/2009 Dutta ...................... G06Q 30/02
706/12
(Continued)

FOREIGN PATENT DOCUMENTS

CN 101034983 A 9/2007
CN 101222348 A 7/2008
(Continued)

OTHER PUBLICATIONS

The World Intellectual Property Organization (WIPO) International Search Report for PCT/CN2016/079419 dated Jun. 28, 2016 5 Pages.
(Continued)

*Primary Examiner* — Glenford J Madamba
*Assistant Examiner* — Abderrahmen Chouat
(74) *Attorney, Agent, or Firm* — Anova Law Group, PLLC

(57) ABSTRACT

The present disclosure relates to the field of network technologies, and discloses a method and apparatus for obtaining a user account. A real-name account of a user is obtained according to user information, and then a first anonymous account similar to the real-name account is obtained based on at least login device information of the real-name account. The user may use an anonymous account to log in on a device on which the real-name account was once used to log in. Therefore, the anonymous account of the user can be obtained by using this hidden association.

19 Claims, 3 Drawing Sheets

(51) Int. Cl.
   *G06F 21/31* (2013.01)
   *G06F 21/62* (2013.01)
   *H04W 12/08* (2009.01)
   *H04L 29/08* (2006.01)

(52) U.S. Cl.
   CPC ...... *H04L 61/2007* (2013.01); *H04L 61/6022* (2013.01); *H04L 63/102* (2013.01); *H04W 12/08* (2013.01); *G06F 2221/2111* (2013.01); *G06F 2221/2117* (2013.01); *H04L 2463/146* (2013.01)

(56) References Cited

U.S. PATENT DOCUMENTS

| | | | | |
|---|---|---|---|---|
| 2012/0271860 A1* | 10/2012 | Graham, Jr. | ...... | G06F 17/30038 707/798 |
| 2013/0117694 A1 | 5/2013 | Shields | | |
| 2014/0136333 A1* | 5/2014 | Shoshitaishvili | ....... | H04L 67/22 705/14.66 |
| 2014/0323081 A1 | 10/2014 | Wang et al. | | |

FOREIGN PATENT DOCUMENTS

| CN | 102647430 A | 8/2012 |
|---|---|---|
| CN | 102647508 A | 8/2012 |
| CN | 103631957 A | 3/2014 |
| CN | 104317784 A | 1/2015 |

OTHER PUBLICATIONS

The State Intellectual Property Office of the People's Republic of China (SIPO) Office Action 1 for 201510196582.X dated Jun. 4, 2019 9 Pages (including translation).

* cited by examiner

METHOD AND APPARATUS FOR OBTAINING USER ACCOUNT

CROSS-REFERENCES TO RELATED APPLICATION

This application is a continuation application of PCT Patent Application No. PCT/CN2016/079419, filed on Apr. 15, 2016, which claims priority to Chinese Patent Application No. 201510196582.X, entitled "METHOD AND APPARATUS FOR OBTAINING USER ACCOUNT", filed on Apr. 22, 2015, the entire contents of both of which are incorporated herein by reference.

FIELD OF THE TECHNOLOGY

The present disclosure relates to the field of network technologies, and in particular, to a method and apparatus for obtaining a user account.

BACKGROUND OF THE DISCLOSURE

With the popularity of network technologies, to provide targeted services that can protect user privacy to users, network operators provide user account services to the users. The users can register their own user accounts with a portal site or an application, so as to use, by logging in with the user accounts, services provided by the network operators.

At present, to ensure security of user accounts, more portal sites or applications require that users need to perform network real-name registration when the users resister user accounts. The network real-name registration refers to that during registration, users need to fill in relatively completed personal information, for example, real names, identity card numbers, phone numbers, and mailboxes, that can be used for recognizing their identities.

However, many websites and applications did not implement the network real-name registration when being put into use at the beginning. In other words, there were users who already obtained user accounts in a manner such as anonymous registration before the network real-name registration is implemented, and the users did not supplement their information later. These accounts may be referred to as anonymous accounts, and actual owners of the accounts usually cannot be found by using these user accounts. Existence of the anonymous accounts makes it difficult for network operators to manage users. In addition, some lawless persons can make profits, or even commit crimes by using a feature of network anonymity. Therefore, a method fir obtaining a user account is urgently needed, so that the network operators can directly associate the anonymous accounts with the actual owners of the user accounts based on the method.

SUMMARY

To resolve the problem in the foregoing technology, embodiments of the present invention provide a method and apparatus for obtaining a user account. The technical solutions are as follows:

According to one aspect, a method for obtaining a user account is provided, including: obtaining user information of a plurality of to-be-analyzed user accounts;

identifying a real-name account from the to-be-analyzed user accounts according to the user information, of the to-be-analyzed user accounts; and determining a first anonymous account similar to the real-name account according to at least login device information of the real-name account.

According to another aspect, an apparatus for obtaining a user account is provided, including one or more processor configured to execute: a user information obtaining module, configured to obtain user information of a plurality of to-be-analyzed user accounts; a real-name account obtaining module, configured to identify a real-name account from the to-be-analyzed user accounts according to the user information of the to-be-analyzed user accounts; and an anonymous account obtaining module, configured to determine a first anonymous account similar to the real-name account according to at least login device information of the real-name account.

According to still another aspect, the present disclosure provides a non-transitory computer-readable storage medium comprising one or more program code for, when being executed by the one or more processors, performing a method for obtaining a user account, the method comprising: obtaining user information of a plurality of to-be-analyzed user accounts; identifying a real-name account from the to-be-analyzed user accounts according to the user information of the to-be-analyzed user accounts; and determining a first anonymous account similar to the real-name account according to at least login device information of the real-name account.

By implementing the technical solutions provided in the embodiments of the present invention, according to the embodiments of the present invention, a real-name account of a user is obtained according to user information, and then a first anonymous account similar to the real-name account is obtained based on at least login device information of the real-name account. The user may use an anonymous account to log in on a device on which the real-name account was once used to log in. Therefore, the anonymous account of the user can be obtained by using this hidden association. In this way, the anonymous account and the real-name account of the user are associated together, so that a network operator can find an actual owner of the anonymous account when managing users, lawless persons are prevented from making profits, or even committing crimes by using a feature of network anonymity, and network security is improved.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present disclosure clearer, the following further describes implementation manners of the present disclosure in detail with reference to the accompanying drawings.

Figure 1:
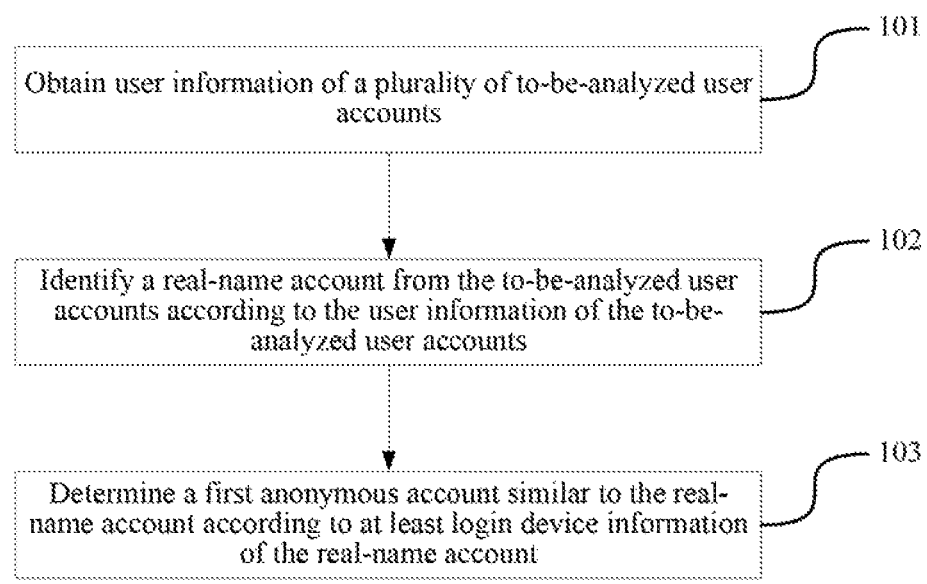
FIG. 1 is a flowchart of a method for obtaining a user account according to an embodiment of the present invention.

FIG. 1 is a flowchart of a method for obtaining a user account according to an embodiment of the present invention. Referring to FIG. 1, the method may include the following steps.

101: Obtaining user information of a plurality of to-be-analyzed user accounts.

A user account refers to an account registered with a portal site or an application by a user for enjoying services provided by a network operator. The user information may include related profile information entered by a user in a process of registering a user account or using the user account, and the user information may include a user nickname, a user birthday, a message left by the user, and the like. Part of the information may be used for deter mining an identity of an actual owner of an account, and for ease of description, this type of information is referred to as specified user information. The specified user information may include at least one of a user contact method, user human-face data, a user signature, or user personal presentation information. The user contact method may include a phone number that is bound, and mailbox information, address information, and the like that are written when a user applies for an account. The user human-face data may be a user human-face image uploaded when a user applies for an account, or an identity document picture, for example, an identity card picture, a driving license picture, or a passport picture, that can be used for determining a user identity. The user signature may be a user signature, for example, a real name or company post information, that can represent a user identity, or the user signature may be a user label added by a friend of a user account to a picture uploaded by the user account. The user personal presentation information may be an individual photo of an actual owner of an account. The to-be-analyzed user accounts and the user information thereof may be obtained from the network operator/service provider. The user information may further include any other available user data collected by the service provider, such as login device information, usage habit information, etc.

102: Obtaining/identifying a real-name account from the to-be-analyzed user accounts according to the user information of the to-be-analyzed user accounts.

The real-name account refers to a user account whose user information includes some specified user information, and this type of account has certain authenticity and effectiveness. The to-be-analyzed user accounts may include the real-name account and an anonymous account. To obtain a foundation for managing users, the real-name account and the anonymous account need to be distinguished, to determine the real-rune account that is in the to-be-analyzed user accounts.

103: Obtaining/determining a first anonymous account similar to real-name account according to at least login device information of the real-name account.

An anonymous account being similar to a real-name account, as used herein, may be considered as a user information similarity exists between the anonymous account and the real-name account. The user information similarity may be evaluated from one or more different aspects, such as login device information, usage habit information (e.g., login habit, comment habit, browsing habit, etc.), or a combination thereof. For example, when the anonymous account and the real-name account share substantially same login device information, the anonymous account may be considered as similar to the real-name account. The login device information of the real-name account includes information such as a signal real-time position, an IP (Internet Protocol) address, a MAC (Media Access Control) address, and a mobile device number of a login device. This type of information has a feature of being unchangeable, and has relatively high reliability when serving as a basis of obtaining the real-name account. For example, the server may, based on a MAC address of a real-time user account, search all the anonymous accounts to check whether there is an anonymous account using the same MAC address. If yes, such anonymous account n ay be identified as similar to the real-time user account.

An anonymous account refers to a user account whose user information does not carry any specified user information, and an owner of the user account cannot be effectively determined by using the user information carried by the user account.

In some embodiments, the first anonymous account similar to the real-name account refers to: login device information of the first anonymous account is similar to the login device information of the real-name account, and the similarity may refer to that a similarity degree is greater than a preset threshold, and when a similarity degree between login device information of any user account and the login device information of the real-name account is greater than the preset threshold in a process of obtaining the first anonymous account, it is determined that the user account is the first anonymous account similar to the real-name account.

According to the method provided in this embodiment of the present invention, a real-name account of a user is obtained according to user information, and then a first anonymous account similar to the real-name account is obtained based on at least login device information of the real-name account. The user may use an anonymous account to log in on a device on which the real-name account was once used to log in. Therefore, the anonymous account of the user can be obtained by using this hidden association. In this way, the anonymous account and the real-name account of the user are associated together, so that a network operator can find an owner of the anonymous account when managing users, lawless persons are prevented from making profits, or even committing crimes by using a feature of network anonymity, and network security is improved.

Optionally, the login device information includes at least one of a signal real-time position, an IP address, a MAC address, or a mobile device number of a login device.

Optionally, after the obtaining a first anonymous account similar to the real-name account according to at least login device information of the real-name account, the method further includes: obtaining a second anonymous account similar to the first anonymous account according to login device information of the first anonymous account.

Optionally, the obtaining a first anonymous account similar to the real-name account accordion to at least login device information of the real-name account includes:

obtaining the first anonymous account similar to the real-name account according to a login time and the login device information of the real-name account; or obtaining the first anonymous account similar to the real-name account according to user usage habits and the login device information of the real-name account; or obtaining the first anonymous account similar to the real-name account according to a login time, user usage habits, and the login device information of the real-name account.

Optionally, the User usage habits include at least one of a webpage browsing habit or a language habit after user login.

Optionally, the obtaining a real-name account from the to-be-analyzed user accounts according to the user information of the to-be-analyzed user accounts includes:

determining, for any user account of the to-be-analyzed user accounts, whether user information of the user account includes specified user information; and obtaining the user account as a real-name account if the user information of the user account includes the specified user information.

Optionally, the specified user information is at least one of a user contact method, user human-face data, a user signature, or user personal presentation information.

Optionally, the user contact method is at least one of a phone number, an e-mailbox, or address information.

Optionally, after the obtaining a first anonymous account similar to the real-name account according, to at least login device information of the real-name account, the method further includes: establishing a mapping relationship among the real-name account, the obtained anonymous accounts, and a user corresponding to the real-name account.

All the foregoing optional technical solutions can be arbitrarily combined to form an optional embodiment of the present disclosure, and details are not described herein.

Figure 2:
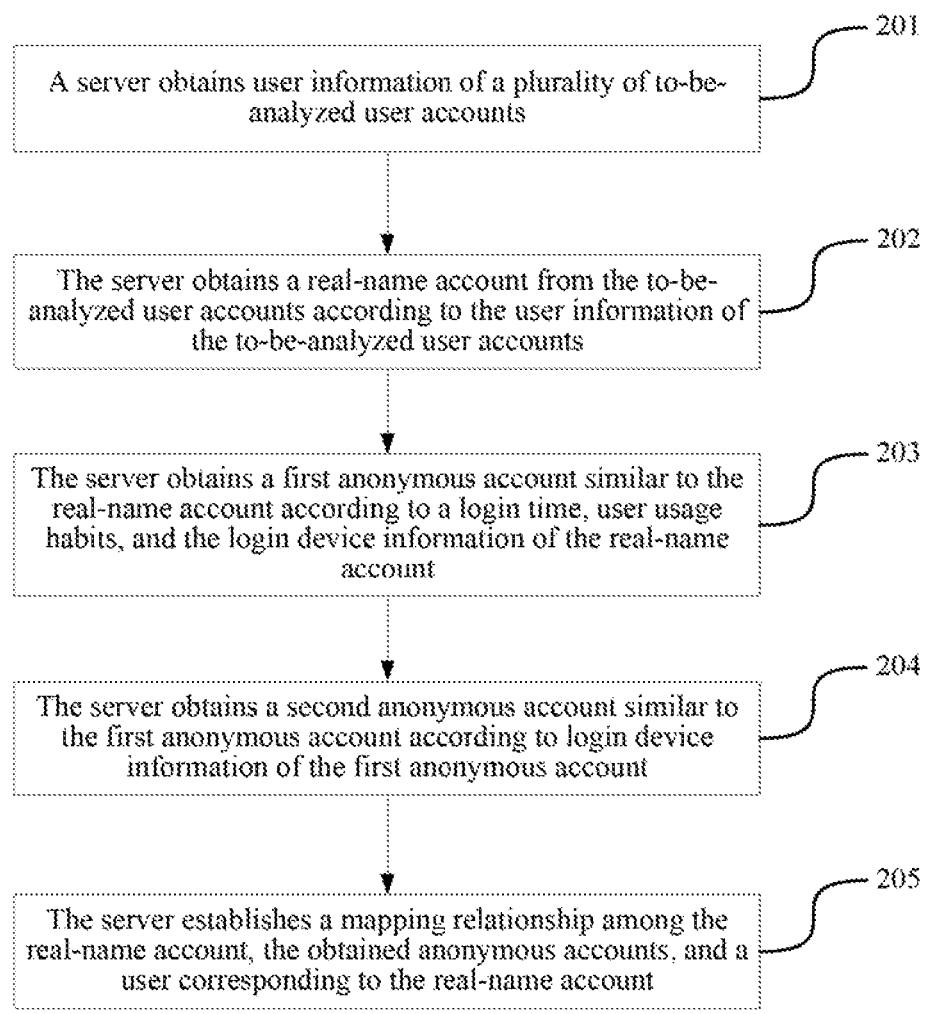
FIG. 2 is a flowchart of a method for obtaining a user account according to an embodiment of the present invention.

FIG. 2 is a flowchart of a method for obtaining a user account according to an embodiment of the present invention. Referring to FIG. 2, the method includes:

201: A: server obtains user information of a plurality of to-be-analyzed user accounts.

Before performing step 201, the server needs to obtain the to-be-analyzed user accounts from an account database. User accounts in the account database may be user accounts under a same account mechanism. For example, when it is determined that user accounts of an instant messaging application need to be analyzed, to-be-analyzed user accounts may be obtained from an account database corresponding to the instant messaging application.

202: The server obtains a real-name account from the to-be-analyzed user accounts according to the user information of the to-be-analyzed user accounts.

Specifically, for any user account of the to-be-analyzed user accounts, it is determined whether user information of the user account includes specified user information; and the user account is obtained/identified as a real-name account if the user information of the user account includes the specified user information. The specified user information is at least one of a user contact method, user human-face data, a user signature, or user personal presentation information. Specifically, for different information types of the specified user information, the process may have several cases as follows:

A first case: When the user information of a user account from the to-be-analyzed user accounts includes the user contact method, the user account is obtained as a real-name account.

In a process of performing real-name registration by a user, the user may need to enter a contact method such as a phone number or a mailbox address, so that the registration is successful only by performing an operation such as activation or verification. Therefore, it can be considered that when the user information includes the user contact method, the user account is an account registered by using a real name, that is, a real-name account. Therefore, it can be determined whether the user information of the user account includes the user contact method, and when it is determined that the user contact method is included, the user account is obtained as a real-name account.

A second case: When the user information of a user account from the to-be-analyzed user accounts includes the user human-face data, the user account is obtained as a real-name account.

In a process of performing real-name registration by a user, a server may require the user to upload a user human-face image to ensure security of a user account, or the server may take a photo for the user as the user human-face data. Certainly, a user may upload an identity document picture, for example, an identity card picture, a driving license picture, or a passport picture, that can be used for determining a user identity in a process of using an account, and user photos on these documents may be used as the user human-face data. Therefore, when the user information includes the user human-face data, the user account is an account registered by using a real name, that is, a real-name account. Therefore, it can be determined whether the user information of the user account includes the user human-face data, and when it is determined that the user human-face data is included, the user account is obtained as a real-name account.

A third case: When the user information of a user account from the to-be-analyzed user accounts includes the user signature, the user account is obtained as a real-name account.

In a process of using a user account: by a user, a user signature for representing a user identity may be added, for example, the user signature may be "Li Ming, General manager of *** company". Alternatively, the user signature may be a user label added by a friend of the user account to a picture uploaded by the user account. For example, a user A uploads a group photo to a personal space, a friend of the user A tags the user A in the group photo, and adds description or a question about the user A, and it is considered that user information of the user account includes a user signature. Therefore, it can be determined whether the user information of the user account includes the user signature, and when it is determined that the user signature is included, the user account is obtained as a real-name account.

A fourth case: When the user information of a user account from the to-be-analyzed user accounts includes the user personal presentation information, the user account is obtained as a real-name account.

In a process of using a user account by a user, personal presentation information may be uploaded to a personal space of the user account. The personal presentation information may be an individual, photo of an actual owner of the account. Specifically, the individual photo uploaded by the user account is detected, and when it is detected that a quantity of times of appearance of an individual photo of a person is greater than a preset threshold, it is determined that the person appearing in the individual photo is the actual owner of the user account, that is, it is determined that the user information of the user account includes the user personal presentation information, and the user account is obtained as a real-name account. In addition, description information of the individual photo uploaded by the user account may be detected in the process, and when the description information is a first-person description, it is determined that a person appearing in the individual photo is the actual owner of the account, that is, it is determined that the user information of the user account includes the user personal presentation information, and the user account is obtained as a real-name account. For example, for an individual photo, the description information is "I am in Beijing, China", it ma be considered that a person in the individual photo is the owner of the user account, that is, the user account is a real-name account.

Further, after it is determined that the user information of a user account does not include the specified user information through the foregoing determination procedures, the user account may be obtained/identified:as an anonymous account. In a subsequent process of obtaining a first anonymous account and a second anonymous account, the first anonymous account and the second anonymous account may be obtained from anonymous accounts that are initially determined in step 202, rather than being obtained from the to-be-analyzed user accounts, thereby reducing a quantity of user accounts needing to be analyzed, and greatly improving obtaining efficiency. In other words, the server may analyze all available user accounts and label each account as either a real-name account or an anonymous account.

203: The server obtains the first anonymous account similar to the real-name account according to a login time, user usage habits, and/or the login device information of the real-name account. In other words, the server may search through the anonymous accounts based on the login device information of the real-time account, and find the first anonymous account similar to the real-name account, the first anonymous account having similar login device information as the real-time account.

The login time of the real-name account may refer to a specific time at which the real-name account logs in to a client on a device, a time period in which a login state is maintained, a specific time at which the login is canceled, or the like. For example, a time at which a real-name account Jogs in to a client on a device is 9:00 in the morning, and the real-name account lags out at 11:00 in the morning. Far the real-name account, the specific time at which the real-name account logs in to the client on the device is 9:00 in the morning, the time period in which a login state is maintained is from 9:00 in the morning to 11:00 in the morning, and the specific time at which the login is canceled is 11:00 in the morning.

The user usage habits may be operation habits of a user on a client, and the user usage habits may include at least one of a webpage browsing habit or a language habit.

The webpage browsing habit may include a type of a webpage browsed by a user, a frequency at which a user remains on a webpage, or the like. For example, the type of a webpage browsed by a user may be a webpage, of a finance and economics type, that is habitually browsed after the user account logs in to a client on a device, or the type of a webpage browsed by a user may be an order in which a user browses different types of webpages, for example, after logging in to a client on a device, the user account first browses a webpage of a finance and economics type, and then browses a webpage of an entertainment type. In addition, the frequency at which a user remains on a webpage may be a time length in which the user account remains on a webpage of a type opened each time or a quantity of times of opening a webpage of a type every day after the user account logs in to a client, for example, a time length in which the user browses a webpage of a finance and economics type is controlled within 10 minutes, and a quantity of times of browsing is 5 to 7 times per day.

The user usage habits may also include a language habit, and the language habit may include user idiomatic phrases, a user speaking frequency, a user comment habit, and the like. The user idiomatic phrases refer to language often used by a user for expressing a particular mood, for example, the user often uses "The weather cannot be better" when describing good weather. The user speaking frequency refers to a frequency at which a user publishes a status, a frequency at which a user publishes information in a community, and the like. For example, a frequency at which the user account updates a status is 20 times per day, or the user account publishes three themed posts in a forum per day. The user comment habit refers to a comment operation commonly performed by a user on a status, information, or the like published by another user. For example, a user account often praises a status published by a friend. The foregoing usage habits may be obtained by collecting usage behaviors of a user and performing update at intervals by using the server, so as to ensure being adaptable to changes of the usage habits of the user.

Specifically, the server can obtain the first anonymous account similar to the real-name account by using the following steps. Step one: Obtain an anonymous account having a similar login time to that of the real-name account from the to-be-analyzed user accounts according to a login time of the real-name account, and store the anonymous account into a first set A. Step two: Obtain an anonymous account that is similar to the real-name account in an aspect of user usage habits from the to-be-analyzed user accounts according to user usage habits of the real-name account, and store the anonymous account into a second set B. Step three: Obtain an anonymous account that is similar to the real-name account in an aspect of login device information from the to-be-analyzed user accounts according to login device information of the teat-name account, and store the anonymous account into a third set C. Step four: Obtain an anonymous account in an intersection set of the first set A, the second set B, and the third set C, that is, a first anonymous account similar to the real-name account. The foregoing process is a process in which sets corresponding to different information are respectively obtained, and the first anonymous account is obtained based on an intersection set of the sets. In an actual scenario, the obtaining process may also be: generating an eigenvector of the real-name account according to a login time, user usage habits, and login device information of the real-name account; then converting all to-be-analyzed anonymous accounts into eigenvectors based on a same vector conversion manner; and calculating similarity degrees between the eigenvector of the real-name account and the eigenvectors of the anonymous accounts, so as to obtain an anonymous account whose similarity degree is greater than a preset threshold, and use the obtained anonymous account as a first anonymous account similar to the real-name account. Certainly, the obtaining process may also be implemented in another mariner, and details are not described in this embodiment of the present invention.

This embodiment of the present invention is described by using an example in which the first anonymous account is obtained based on the login time, the user usage habits, and the login device information of the real-name account. Certainly, a quantity of first anonymous accounts obtained based on the three types of information is relatively few. Step 203 may further be replaced by using the following process to expand the quantity of first anonymous accounts: obtaining the first anonymous account similar to the real-name account according to a login time and the login device information of the real-name account; or obtaining the first anonymous account similar to the real-name account according to user usage habits and the login device information of the real-name account. It should be noted that the obtaining manner executed in the replacement process may be the same as the obtaining performed based on the login time, the user usage habits, and the login device information, and a specific process of the obtaining manner is not described in detail herein.

204: The server obtains/determines a second anonymous account similar to the first anonymous account according to login device information of the first anonymous account.

The first anonymous account is determined based on the real-name account, and relatively, the first anonymous account has uncertainty. Therefore, more anonymous accounts, that is, the second anonymous accounts, that may have an association relationship with the user are obtained according to more reliable information, such as the login device information of the first anonymous account.

The login device information of the first anonymous account includes information such as a signal real-time position, an IP (Internet Protocol) address, a MAC (Media Access Control) address, and a mobile device number of a login device. This type of information has a feature of being unchangeable, and has relatively high reliability when serving as a basis of obtaining the second anonymous account.

Specifically, the server may obtain a second anonymous account similar to the first anonymous account based on a method that is the same as step 203. Certainly, a quantity of the second anonymous accounts obtained based on the four types of information such as the signal real-time position, the IP (Internet Protocol) address, the MAC (Media Access Control) address, and the mobile device number of the login device of the first anonymous account is relatively few, and to increase the quantity of the second anonymous accounts, step 204 may use only any one or more of the four types of information as an obtaining condition. For example, the second anonymous account similar to the first anonymous account is obtained only by using the mobile device number of the login device of the first anonymous account as the obtaining condition; or the second anonymous account similar to the first anonymous account is obtained only by using the mobile device number and the IP address of the login device of the first anonymous account as the obtaining condition. Other obtaining condition combination forms are not described in detail herein.

205: The server establishes a mapping relationship among the real-name account, the obtained anonymous accounts, and a user corresponding to the real-thine account.

The mapping relationship refers to a mapping relationship among, the real-name account, the anonymous account, and the user. A mapping relationship established by using, steps 201 to 203 may be a mapping relationship among the real-name account, the first anonymous account, and the user. A mapping relationship established by using steps 201 to 204 may be a relationship among the real lame account, the first anonymous account, the second anonymous account, and the user. The user corresponding to the real-name account may be determined according to specified user information in the real-name account. Specifically, the specified user information is reflected as a user name, an identity card number, a user phone number, or the like.

The mapping relationship is established and stored, so that when a query request for any user is received, a real-name account and an anonymous account that are owned by the user may be determined according to the mapping relationship; when a query request for any anonymous account is received, a real-name account corresponding to the anonymous account and an actual owner of the account may be determined according to the mapping relationship; and when a query request for any real-name account is received, an actual owner of the real-name account and another anonymous account of the actual owner of the account may be determined according to be mapping relationship.

In an actual scenario, an established mapping relationship may be, presented in a table form. Using the mapping relationship established based on steps 201 to 204 as an example, if first obtained specified user information is an identity card number of 110102******, the real-name account of the user is M1, the first anonymous accounts are N1 and N2, and the second anonymous accounts are L1 and L2. Second obtained specified user information is a phone number of 1314665**, the real-name account of the user is M2, the first anonymous account is F1, and the second anonymous accounts are G1, G2, and G3. After the obtained content is stored into a table, a form of the fable may be shown in Table 1.

TABLE 1

| Specified user information | Real-name account | Anonymous account |
|---|---|---|
| Identity card number: 110102******** | M1 | N1, N2, L1, L2 |
| Phone number: 1314665**** | M2 | F1, G1, G2, G3 |

That is, if the server needs to locate the anonymous account N1, it can be known from Table 1 that an identity card number of a user owning the anonymous account N1 is 110102********, and the user also owns the real-name account M1 and other anonymous accounts N2, L1, and L2. Certainly, the server can also obtain, by locating specified user information, a real-name account and anonymous accounts corresponding to the specified user information. Alternatively, the server obtains, by locating a real-name account, specified user information and anonymous accounts of an owner of the real-name account.

Certainly, the server can also establish clapping relationship in another form, which is not specifically limited in this embodiment of the present invention.

According to the method provided in this embodiment of the present invention, a real-name account of a user is obtained according to user information, and then a first anonymous account similar to the teal-name account is obtained based an at least login device information of the real-name account. The user may use an anonymous account to log in on a device on which the real-name account was once used to log in. Therefore, the anonymous account of the user can be obtained by using this hidden association. In this way, the anonymous account and the real-name account of the user are associated together, so that a network operator can find an owner of die anonymous account when managing users, lawless persons are prevented from making profits, or even committing crimes by using a feature of network anonymity, and network security is improved. Further, a second anonymous account similar to the first anonymous account is obtained according to the first anonymous account, thereby expanding a query range, so that more suspicious anonymous accounts can be obtained. Furthermore, a mapping relationship among the real-name account, the first anonymous account, the second anonymous account, and the user is established and stored, so as to be more convenient to query the user and the user account owned by the user in a sequent management process.

Figure 3:
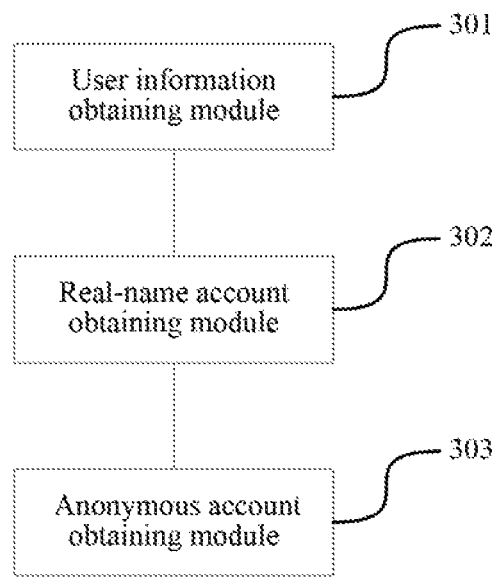
FIG. 3 is a schematic structural diagram of an apparatus for obtaining a user account according to an embodiment of the present invention.

FIG. 3 is a schematic structural diagram of an apparatus for obtaining a user account according to an embodiment of the present invention. Referring to FIG. 3, the apparatus includes: a user information obtaining module 301, configured to obtain, according to to-be-analyzed user accounts, user information of the to-be-analyzed user accounts; a real-name account obtaining module 302, configured to obtain/identify a real-name account from the to-be-analyzed user accounts according to the user information of the to-be-analyzed user accounts obtained by the user information obtaining module 301; and an anonymous account, obtaining module 303, configured to obtain/determine a first anonymous account similar to the real-name account according to at least login device information of the real-name account obtained by the real-name account obtaining module 302.

Optionally, the login device information includes at least one of a signal real-tune position, an IP address, a MAC address, or a mobile device number of a login device.

Optionally, the anonymous account obtaining module 303 is further configured to obtain a second anonymous account similar to the first anonymous account according to login device information of the first anonymous account.

Optionally, the anonymous account obtaining module 303 is configured to obtain the first anonymous account similar to the real-name account according to a login time and the login device information of the real-name account obtained by the real-name account obtaining module 302; or the anonymous account obtaining module 303 is configured to obtain a first anonymous account similar to the real-name account according to user usage habits and login device information of the real-name account obtained by the real-name account obtaining module 302; or the anonymous account obtaining module 303 is configured to obtain a first anonymous account similar to the real-name account according to a login time, user usage habits, and login device information of the real-name account obtained by the real-name account obtaining module 302.

Optionally, the user usage habits include at least one of a webpage browsing habit or a language habit after user login.

Optionally, the real-name account obtaining module 302 is further configured to: determine, for any user account of the to-be-analyzed user accounts, whether user information of the user account includes specified user information; and obtain the user account as a real-name account if the user information of the user account includes the specified user information.

Optionally, the specified user information is at least one of a user contact method, user human-face data, a user signature, or user personal presentation information.

Optionally, the user contact method is at least one of a phone number, an e-mailbox, or address information.

Optionally, the apparatus further includes: an establishment module, configured to establish a mapping relationship among the real-name account, the obtained anonymous accounts, and a user corresponding to the real-name account.

All the foregoing optional technical solutions can be arbitrarily combined to form an optional embodiment of the present disclosure, and details are described herein.

According to the apparatus provided in this embodiment of the present invention, a real-name account of a user is obtained according to user information, and then a first anonymous account similar to the real-name account is obtained based on at least login device information of the real-name account. The user may use an anonymous account to log in on a device on which the real-name account was once used to log in. Therefore, the anonymous account of the user can be obtained by using this hidden association. In this way, the anonymous account and the real-name account of the user are associated together, so that a network operator can find an owner of the anonymous account when managing users, lawless persons are prevented from making profits, or even committing crimes by using a feature of network anonymity, and network security is improved.

It should be noted that division of the above functional modules are only described as an example when the apparatus for obtaining a user account provided in the foregoing embodiments obtains a user account. In actual applications, the functions may be allocated according to needs to be implemented by different functional modules, that is, the internal structure of the apparatus is divided into different functional modules to complete all or some of the above described functions. In addition, the apparatus for obtaining a user account provided in the foregoing embodiment is based on the same concept as the method for obtaining a user account in the foregoing embodiments. For the specific implementation process, refer to the method embodiments, and details are not described herein again.

Figure 4:
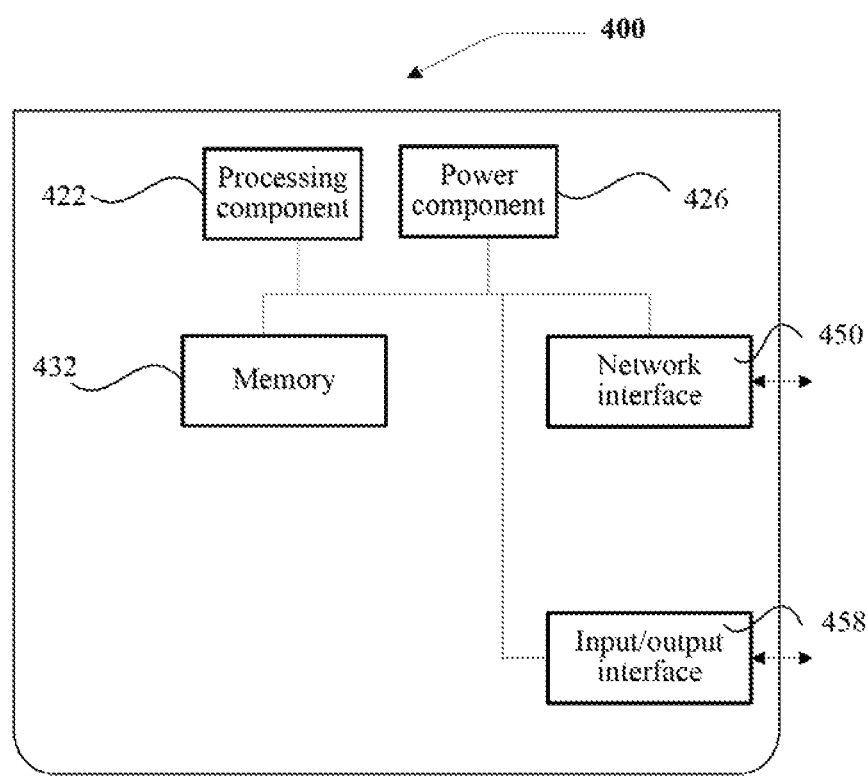
FIG. 4 is a block diagram of an apparatus 400 for obtaining a user account according to an example of an embodiment.

FIG. 4 is a block diagram of an apparatus 400 for obtaining a user account according to an example of an embodiment. For example, the apparatus 400 may be provided as a server. Referring to FIG. 4, the apparatus 400 includes a processing component 422, and further includes one or more processors, and storage resources represented by a memory 432.

The memory 432 is configured to store instructions, for example, an application program, that can be executed by the procession component 422. The application program stored in the memory 432 may include one or more modules (such as the program modules shown in FIG. 3), each of which corresponds to a group of instructions available for being executed by the processing component 422. In addition, the processing component 422 is configured to execute instructions, so as to execute the method for obtaining a user account shown in FIG. 1 or FIG. 2.

The apparatus 400 may further include a power component 426 configured to execute power management of the apparatus 400, a wired or wireless network interface 450 configured to connect the apparatus 400 to a network, and an input/output (I/O) interface 458. The apparatus 400 may operate an operating system, for example, Windows Server™, Mac OS X™, Unix™, Linux™, or FreeBSD™, that is stored in the memory 432.

In an example of an embodiment, a non-temporary/non-transitory computer readable storage medium including instructions is further provided, for example, a memory including instructions, and the foregoing instructions may be executed by a processor in a terminal to complete a method for obtaining a user account in the following embodiment. For example, the non-temporary computer readable storage medium may be a ROM, a random access memory (RAM), a CD-ROM, a tape, a floppy disk, or an optical data storage device.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

What is described above is merely an example of the embodiments of the present invention, and is not intended to limit the present invention. Any modifications, equivalent variations, and improvements made in accordance with the spirits and principles of the present invention shall fail within the protection scope of the present disclosure.

What is claimed is:

1. A method for obtaining a user account, comprising:
obtaining user information of a plurality of to-be-analyzed user accounts registered with a website or application;
identifying a real-name account from the to-be-analyzed user accounts according to the user information of the to-be-analyzed user accounts, comprising:
   determining, for a user account of the to-be-analyzed user accounts, whether user information of the user account comprises specified user information, the specified information including at least one of: user human-face data from an identity verification image of the user account, a user signature added by the user account or by a friend account of the user account, and personal presentation information extracted from a plurality of photos uploaded by the user account with same person appearance; and
   identifying the user account as a real-name account when the user information of the user account comprises the specified user information; and
determining a first anonymous account similar to the real-name account according to at least two of a login time, login device information, and user usage habits of the real-name account, the first anonymous account being one of the to-be-analyzed user accounts registered with the same website or application that does not comprise any one of the user human-face data, the user signature or the personal presentation information;
establishing a mapping relationship between the specified user information, the real-name account, and the first anonymous account; and
in response to a user management request corresponding to the first anonymous account, locating the real-name account and the specified user information based on the mapping relationship,
wherein determining the first anonymous account similar to the real-name account comprises:
   generating an eigenvector of the real-name account based on a vector conversion manner according to the login time, the user usage habits, and the login device information of the real-name account;
   generating eigenvectors of all anonymous accounts in the to-be-analyzed user accounts based on the same vector conversion manner, wherein each anonymous account is one of the to-be-analyzed user accounts that does not comprise any specified user information;
   obtaining similarity degrees between the eigenvector of the real-name account and the eigenvectors of the anonymous accounts; and
   determining an anonymous account having a corresponding similarity degree greater than a preset threshold as the first anonymous account similar to the real-name account.

2. The method according to claim 1, wherein the login device information comprises at least one of a signal real-time position, an Internet Protocol (IP) address, a Media Access Control (MAC) address, or a mobile device number of a login device.

3. The method according to claim 1, after the determining a first anonymous account similar to the real-name account according to at least login device information of the real-name account, further comprising:
determining a second anonymous account similar to the first anonymous account according to login device information of the first anonymous account.

4. The method according to claim 1, wherein the determining a first anonymous account similar to the real-name account comprises:
determining the first anonymous account similar to the real-name account according to the login time and the login device information of the real-name account; or
determining the first anonymous account similar to the real-name account according to the user usage habits and the login device information of the real-name account; or
determining the first anonymous account similar to the real-name account according to the login time, the user usage habits, and the login device information of the real-name account.

5. The method according to claim 1, wherein the user usage habits comprises at least one of a webpage browsing habit or a language habit after user login.

6. The method according to claim 1, wherein the specified user information further includes a user contact method.

7. The method according to claim 6, wherein the user contact method includes at least one of a phone number, an e-mailbox, or address information.

8. The method according to claim 1, wherein the user management request corresponding to the first anonymous account is generated when detecting an abnormal activity of the first anonymous account, the abnormal activity being illegal profit making or crime activity by using a feature of network anonymity.

9. The method according to claim 1, wherein identifying a real-name account from the to-be-analyzed user accounts comprises:
detecting a group photo uploaded by the friend account of the user account to the website or application;
obtaining a tag from the group photo added by the friend account that targeted the user account, the tag including a description or a label;
determining that the user information of the user account comprises the user signature added by the friend account of the user account; and
identifying the user account as a real-name account.

10. The method according to claim 1, wherein identifying a real-name account from the to-be-analyzed user accounts comprises:
detecting the plurality of photos uploaded by the user account with same person appearance;
determining that a number of appearances of the same person is greater than a preset threshold;
in response to determining that the number of appearances of the same person is greater than the preset threshold, determining that the user information of the user account comprises the personal presentation information; and
identifying the user account as a real-name account.

11. The method according to claim 10, wherein determining that the user information of the user account comprises the personal presentation information comprises:
detecting description information of a photo from the plurality of photos uploaded by the user account with same person appearance;
determining that the description information is a first-person description; and
in response to determining that the number of appearances of the same person is greater than the preset threshold and that the description information is the first-person description, determining that the user information of the user account comprises the personal presentation information.

12. An apparatus for obtaining a user account, comprising one or more processors configured to execute:
- a user information obtaining module, configured to obtain user information of a plurality of to-be-analyzed user accounts registered with a website or application;
- a real-name account obtaining module, configured to identify a real-name account from the to-be-analyzed user accounts according to the user information of the to-be-analyzed user accounts, comprising:
  - determining, for a user account of the to-be-analyzed user accounts, whether user information of the user account comprises specified user information, the specified information including at least one of: user human-face data from an identity verification image of the user account, a user signature added by the user account or by a friend account of the user account, and personal presentation information extracted from a plurality of photos uploaded by the user account with same person appearance; and
  - identifying the user account as a real-name account when the user information of the user account comprises the specified user information; and
- an anonymous account obtaining module, configured to determine a first anonymous account similar to the real-name account according to at least two of a login time, login device information, and user usage habits of the real-name account, the first anonymous account being one of the to-be-analyzed user accounts registered with the same website or application that does not comprise any one of the user human-face data, the user signature or the personal presentation information;
- an establishment module, configured to establish a mapping relationship between the specified user information, the real-name account, and the first anonymous account; and in response to a user management request corresponding to the first anonymous account, locate the real-name account and the specified user information based on the mapping relationship,
- wherein the anonymous account obtaining module is further configured to:
  - obtain at least two sets of: a set of anonymous accounts having similar login time as the real-name account, a set of anonymous accounts having same login device information as the real-name account, a set of anonymous accounts having similar user usage habits as the real-name account, wherein each anonymous account is one of the to-be-analyzed user accounts that does not comprise any specified user information;
  - obtain an intersection set of the at least two sets; and
  - determine an account in the intersection set as the first anonymous account.

13. The apparatus according to claim 12, wherein the login device information comprises at least one of a signal real-time position, an Internet Protocol (IP) address, a Media Access Control (MAC) address, or a mobile device number of a login device.

14. The apparatus according to claim 12, wherein the anonymous account obtaining module being is configured to determine a second anonymous account similar to the first anonymous account according to login device information of the first anonymous account.

15. The apparatus according to claim 12, wherein the anonymous account obtaining module is further configured to:

determine the first anonymous account similar to the real-name account according to the login time and the login device information of the real-name account; or
determine the first anonymous account similar to the real-name account according to the user usage habits and the login device information of the real-name account; or
determine the first anonymous account similar to the real-name account according to the login time, the user usage habits, and the login device information of the real-name account.

16. The apparatus according to claim 12, wherein:
the specified user information further includes a user contact method; and
the user contact method includes at least one of a phone number, an e-mailbox, or address information.

17. A non-transitory computer-readable storage medium comprising one or more program code for, when being executed by the one or more processors, performing a method for obtaining a user account, the method comprising:
- obtaining user information of a plurality of to-be-analyzed user accounts registered with a website or application;
- identifying a real-name account from the to-be-analyzed user accounts according to the user information of the to-be-analyzed user accounts, comprising:
  - determining, for a user account of the to-be-analyzed user accounts, whether user information of the user account comprises specified user information, the specified information including at least one of: user human-face data from an identity verification image of the user account, a user signature added by the user account or by a friend account of the user account, and personal presentation information extracted from a plurality of photos uploaded by the user account with same person appearance; and
  - identifying the user account as a real-name account when the user information of the user account comprises the specified user information; and
- determining a first anonymous account similar to the real-name account according to at least two of a login time, login device information, and user usage habits of the real-name account, the first anonymous account being one of the to-be-analyzed user accounts registered with the same web site or application that does not comprise any one of the user human-face data, the user signature or the personal presentation information;
- establishing a mapping relationship between the specified user information, the real-name account, and the first anonymous account; and
- in response to a user management request corresponding to the first anonymous account, locating the real-name account and the specified user information based on the mapping relationship,
- wherein determining the first anonymous account similar to the real-name account comprises:
  - generating an eigenvector of the real-name account based on a vector conversion manner according to the login time, the user usage habits, and the login device information of the real-name account;
  - generating eigenvectors of all anonymous accounts in the to-be-analyzed user accounts based on the same vector conversion manner, wherein each anonymous account is one of the to-be-analyzed user accounts that does not comprise any specified user information;

obtaining similarity degrees between the eigenvector of the real-name account and the eigenvectors of the anonymous accounts; and determining an anonymous account having a corresponding similarity degree greater than a preset threshold as the first anonymous account similar to the real-name account.

18. The non-transitory computer-readable storage medium according to claim 17, after the determining a first anonymous account similar to the real-name account according to at least login device information of the real-name account, the method further comprising:

obtaining a second anonymous account similar to the first anonymous account according to login device information of the first anonymous account.

19. The non-transitory computer-readable storage medium according to claim 17, the determining a first anonymous account similar to the real-name account comprising:

determining the first anonymous account similar to the real-name account according to the login time and the login device information of the real-name account; or determining the first anonymous account similar to the real-name account according to the user usage habits and the login device information of the real-name account; or determining the first anonymous account similar to the real-name account according to the login time, the user usage habits, and the login device information of the real-name account.

* * * * *